United States Patent
Onishi et al.

(10) Patent No.: US 8,207,677 B2
(45) Date of Patent: Jun. 26, 2012

(54) LIGHTING EQUIPMENT

(75) Inventors: Naoki Onishi, Hyogo (JP); Keisuke Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 12/745,812

(22) PCT Filed: Nov. 14, 2008

(86) PCT No.: PCT/JP2008/070764
§ 371 (c)(1),
(2), (4) Date: Jun. 2, 2010

(87) PCT Pub. No.: WO2009/081668
PCT Pub. Date: Jul. 2, 2009

(65) Prior Publication Data
US 2010/0244743 A1 Sep. 30, 2010

(30) Foreign Application Priority Data
Dec. 21, 2007 (JP) ................................ 2007-331165

(51) Int. Cl.
*H05B 37/02* (2006.01)
(52) U.S. Cl. ..... 315/224; 315/247; 315/246; 315/209 R; 315/291
(58) Field of Classification Search .......... 315/224, 315/225, 246, 209 R, 247, 291, 307
See application file for complete search history.

(56) References Cited

U.S. PATENT DOCUMENTS

| 5,802,932 A | 9/1998 | Vankov et al. |
| 7,329,996 B2 * | 2/2008 | Hsu .................. 315/209 SC |
| 2006/0085985 A1 | 4/2006 | Oh |

FOREIGN PATENT DOCUMENTS

| DE | 19824176 | 2/1999 |
| EP | 1621299 | 2/2006 |
| GB | 2036631 | 7/1980 |
| JP | 2001-15276 | 1/2001 |
| JP | 2006-19244 | 1/2006 |
| JP | 2006-172998 | 6/2006 |

OTHER PUBLICATIONS

Extended European search report, mailed on Mar. 25, 2011.

* cited by examiner

*Primary Examiner* — Tuyet Thi Vo
(74) *Attorney, Agent, or Firm* — Greenblum & Bernstein, P.L.C.

(57) ABSTRACT

An illumination apparatus, which controls a supply power supplied to a lamp according to an accumulated interval of on-time and a light control signal, is configured in which a maximum supply power supplied to the lamp according to the accumulated interval of on-time is supplied to the lamp when the supply power to the lamp corresponding to the light control signal is above the maximum supply power to the lamp according to the accumulated interval of on-time at a point when the illumination apparatus is turned on or the lamp starts lighting. When the light control signal is operated so as to exceed a level of the maximum supply power to the lamp according to the accumulated interval of on-time or the light control signal varies more than a prescribed level, the supply power is shifted to an adjustable condition so as to be higher than the maximum supply power to the lamp according to the accumulated interval of on-time.

6 Claims, 7 Drawing Sheets

LIGHTING EQUIPMENT

TECHNICAL FIELD

The present invention relates to an illumination apparatus having an initial illuminance correction function to control an output power according to an accumulated interval of on-time of a lamp, and a light control function to control brightness of a lamp.

BACKGROUND ART

Generally, a light flux (brightness) of a lamp represented by a discharge lamp is gradually decreased according to an elapsed time due to a degradation of substances of the lamp by heat and light irradiation, and grime such as dust deposited on the lamp. In the case of a fluorescent lamp, for instance, a fluorescent substance applied to the fluorescent lamp is degraded by generated heat of the lamp during lighting, thereby gradually decreasing a light flux (hereinafter, this phenomenon is referred to as a light flux decline). Therefore, an illumination apparatus configuration and the number of apparatuses to be provided are determined, in general, to obtain brightness more than necessary when the lamp is new, in order to maintain desirable brightness even if a light flux is decreased during a use of the lamp. Thus, an illumination apparatus, in which an accumulated interval of on-time of a lamp is stored and a power supplied to the lamp gradually increases as the accumulated interval of on-time increases, whereby a light flux reduction according to the increase of the accumulated interval of on-time is corrected, has been known. By using such an illumination apparatus, it is possible to achieve desired approximately-constant brightness independent of an operating time of the lamp, and suppress unnecessary brightness when the lamp is new. In addition, it is possible to obtain an advantage of achieving low power consumption by saving electricity to be consumed.

In the illumination apparatus including the so-called "initial illuminance correction function", it is possible to further save electricity by combination of a light control function that a user can arbitrarily control brightness. With regard to the illumination apparatus with the combination of such an initial illuminance correction function and a light control function, an illumination apparatus as disclosed in Patent Citation 1 has been known, for instance, in which the illumination apparatus is configured to correct a supply power supplied to the discharge lamp obtained by a light flux holding ratio of the discharge lamp according to an accumulated interval of on-time, with a light control ratio externally specified, so as to determine the supply power to the discharge lamp. Specifically, when the supply power obtained by the light flux holding ratio according to the accumulated interval of on-time is 70%, and when a light control signal to specify 50% of a light control is externally input, the illumination apparatus is configured to turn on the discharge lamp with a power of 70%×50%=35%. Due to such a configuration, it is possible to relatively easily obtain the illumination apparatus configured with the combination of the initial illuminance correction function and the light control function.

Figure 1:
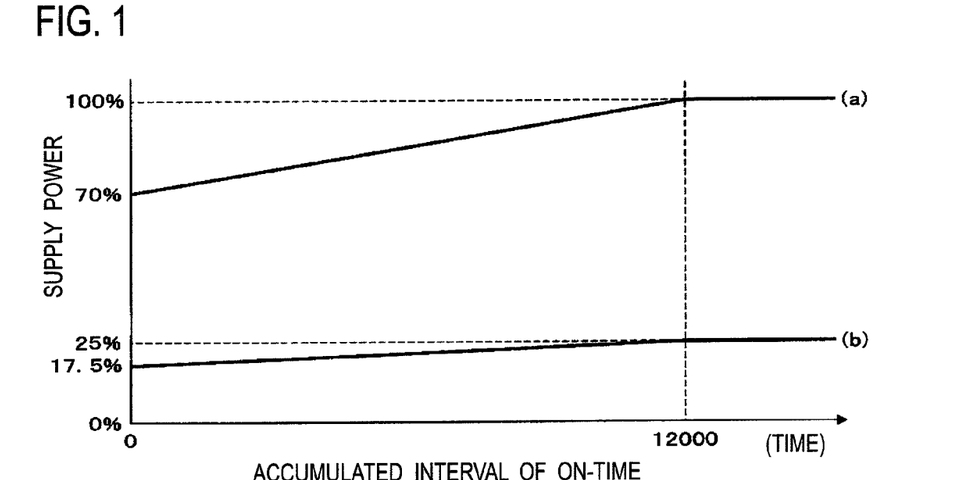
FIG. 1 is an operational explanatory diagram of a conventional illumination apparatus having an initial illuminance correction function and a light control function.

A specific operation example of the illumination apparatus with the combination of the initial illuminance correction function and the light control function will be described with reference to FIG. 1 and FIG. 2. As shown in FIG. 1(a), a maximum supply power to a lamp, which can be output by the light control function, is limited to approximately 70% of a rated power of the lamp when the lamp is in an initial lighting point (the accumulated interval of on-time is 0 hour). Note that, the maximum supply power at the initial lighting point is arbitrarily set so as to suppress unnecessary brightness at the initial lighting point based on a light flux decline property of the lamp. In addition, as shown in FIG. 1(b), when a minimum light control ratio of the light control function is 25%, for instance, a minimum supply power to the lamp, which can be output by the light control function, is limited to 70%×25%=17.5% when the lamp is in the initial lighting point (the accumulated interval of on-time is 0 hour).

When the supply power gradually increases so as to correct lowered brightness due to the light flux decline of the lamp as the accumulated interval of on-time of the lamp increases, and when the accumulated interval of on-time reaches a rated lamp life (12,000 hours in this case) or near, the maximum supply power shown in FIG. 1(a) increases to 100% (the rated power of the lamp or near). In addition, the minimum supply power shown in FIG. 1(b) increases to 100%×25%=25%, in proportion to the increase of the maximum supply power.

Figure 2:
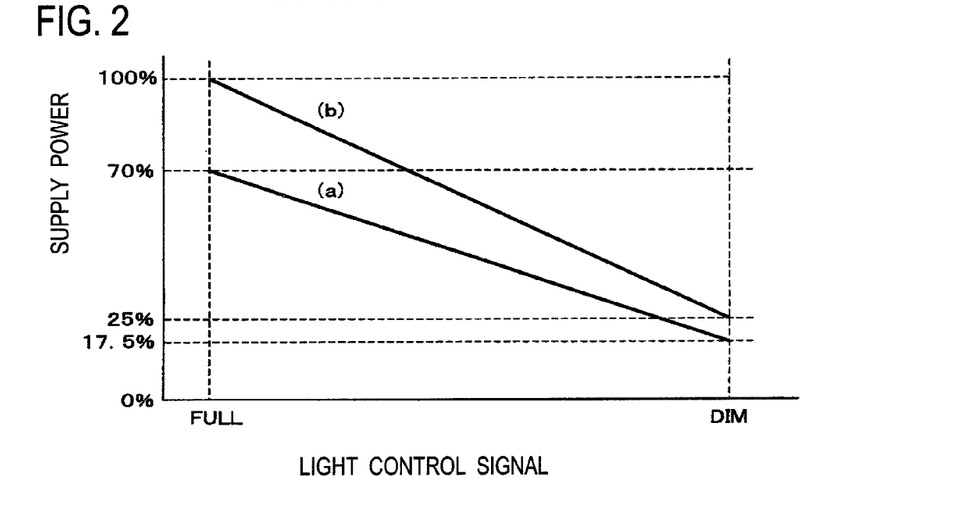
FIG. 2 is an explanatory diagram showing a relationship between a light control signal and a supply power to a lamp of the illumination apparatus of FIG. 1.

Next, FIG. 2 shows a relationship between the light control signal and the amount of the supply power supplied to the lamp. As shown in FIG. 2(a), when the lamp is in the initial lighting point (the accumulated interval of on-time is 0 hour), the supply power to the lamp is 70% that is the maximum supply power in the initial lighting point when the light control signal has the maximum value (FULL). In addition, the supply power to the lamp is 17.5% that is the minimum supply power in the initial lighting point when the light control signal has the minimum value (DIM). Moreover, as shown in FIG. 2(b), after the accumulated interval of on-time reaches the rated lamp life (12,000 hours in this case) or near, the supply power to the lamp is 100% that is the maximum supply power when the light control signal has the maximum value (FULL), and the supply power to the lamp is 25% when the light control signal has the minimum value (DIM).

Due to such a control process as described above, the illumination apparatus concurrently having the initial illuminance correction function and the light control function is provided.

Patent Citation 1: Japanese Patent Application Laid-Open Publication No. 2001-015276

DISCLOSURE OF INVENTION

Technical Problem

It is possible to achieve the illumination apparatus, by performing control processing described in the section of BACKGROUND ART, that concurrently has what is called an "initial illuminance correction function" that achieves an approximately-constant illuminance independent of the operating time of the lamp, suppresses unnecessary brightness when the lamp is new, stores the accumulated interval of on-time of the lamp and controls the lamp so that the power supplied to the lamp gradually increases as the accumulated interval of on-time increases in order to save electricity to be consumed, and a "light control function" that arbitrarily controls brightness corresponding to the light control signal from a light controller and a sensor unit.

However, in the above-described prior art, the illumination apparatus could not provide brightness corresponding to a power larger than the maximum supply power limited by the initial illuminance correction function even when a user temporarily desired output brightness corresponding to the power larger than the maximum supply power limited by the initial illuminance correction function. Moreover, there was a problem of a provision of an additional switching means in order to temporarily provide brightness corresponding to the power larger than the maximum supply power limited by the initial illuminance correction function, since the additional switching means required a user to have an extra step of a switching operation every time and resulted in impairing convenience.

The present invention has been made focusing on the above-described problems. An object of the present invention is to provide the illumination apparatus capable of temporarily providing brightness corresponding to a power larger than the maximum supply power limited by the initial illuminance correction function by means of a normal operation of a light controller without any additional switching operation by a user.

Technical Solution

To solve the above-mentioned problems, an illumination apparatus of the present invention includes a lighting device adapted to turn on a lamp and control supply power to the lamp, means for measurement and storage of an accumulated interval of on-time of the lamp, and means for control of supply power to the lamp in accordance with the accumulated interval of on-time as stored, characterized by: means for varying supply power to the lamp in accordance with an externally input light control signal; and use of a prescribed operation with respect to a light control signal for supply power to the lamp to be adjustable to be higher than a maximum supply power to the lamp in accordance with the accumulated interval of on-time.

The invention of claim 2 is the illumination apparatus according to claim 1, characterized by adaptation to work with the prescribed operation with respect to a light control signal to adjust supply power to the lamp in accordance with a light control signal at least within a range of supply power equal to or larger than the maximum supply power to the lamp in accordance with the accumulated interval of on-time.

The invention of claim 3 is the illumination apparatus according to claim 1 or 2, characterized by adaptation to have a variable range of supply power to the lamp in accordance with a light control signal at least from a rated power or near to a prescribed minimum power of the lamp, and work, upon power-on of the illumination apparatus or start of illumination of the lamp with supply power to the lamp in accordance with a light control signal exceeding the maximum supply power to the lamp in accordance with the accumulated interval of on-time, to supply the lamp with the maximum supply power to the lamp in accordance with the accumulated interval of on-time.

The invention of claim 4 is the illumination apparatus according to any one of claims 1 to 3, characterized by adaptation to have the prescribed operation with respect to a light control signal to operate a light control signal to exceed the maximum supply power to the lamp in accordance with the accumulated interval of on-time after power-on of the illumination apparatus or start of illumination of the lamp.

The invention of claim 5 is the illumination apparatus according to any one of claims 1 to 3, characterized by adaptation to have the prescribed operation with respect to a light control signal to vary a light control signal in a prescribed level or more after power-on of the illumination apparatus or start of illumination of the lamp.

The invention of claim 6 is the illumination apparatus according to claim 5, characterized by adaptation to have the prescribed operation with respect to a light control signal to be valid only for supply power to the lamp below the maximum supply power to the lamp in accordance with the accumulated interval of on-time.

Advantageous Effects

According to the present invention, it is possible to obtain a high power-saving effect due to the illumination apparatus concurrently having the initial illuminance correction function and the light control function. Moreover, it is possible to temporarily provide brightness corresponding to a power larger than the maximum supply power limited by the initial illuminance correction function by means of the normal operation of the light controller without any additional switching operation by a user when the user temporarily desires brightness corresponding to the power larger than the maximum supply power limited by the initial illuminance correction function.

EXPLANATION OF REFERENCE

10 Inverter Circuit
11 Lamp
12 Inverter Controller
13 Output Command Value Controller
14 Light Control Signal
15 Interval of On-Time Counter
16 Nonvolatile Memory

BEST MODE FOR CARRYING OUT THE INVENTION

A description will be made below of embodiments according to the present invention with reference to the drawings. Note that, the same reference numeral applied to components in each figure represents the same constitution, and repeated explanations are omitted.

First Embodiment

Figure 3:
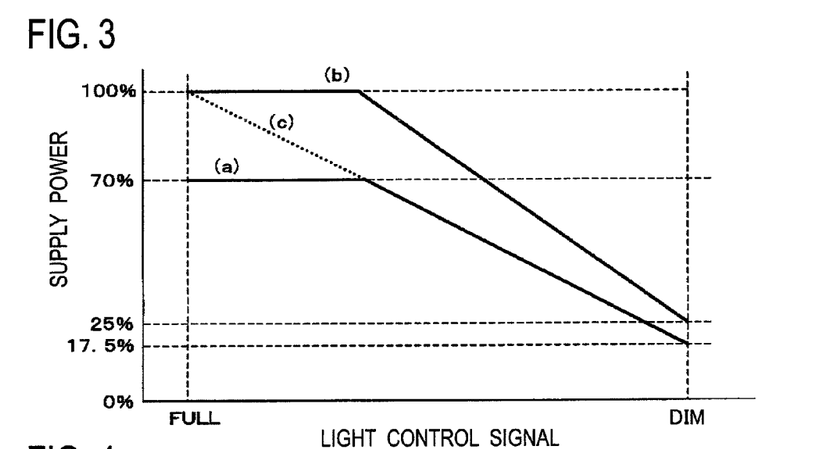
FIG. 3 is an operational explanatory diagram of a first embodiment of the present invention.

An illumination apparatus according to the first embodiment of the present invention will be explained. FIG. 3 shows an operational explanatory diagram of the illumination apparatus of the present embodiment. The illumination apparatus of the present embodiment has the initial illuminance correction function and the light control function similar to the prior art of FIG. 1. One difference from the conventional operation is that the light control signal has light control signal intervals in which a supply power is maintained constant at the maximum supply power limited by the initial illuminance correction function adjacent to the maximum value (FULL), with regard to the relationship between the light control signal and the supply power to the lamp shown in FIGS. 3(a) and 3(b). Another difference from the conventional operation is that a light control operation is available in a range between the output at 100% and the minimum supply power throughout a range from the maximum value (FULL) to the minimum value (DIM) of the light control signal as shown in FIG. 3(c) when a user temporarily desires an output larger than the maximum supply power limited by the initial illuminance correction function.

Specifically, the maximum supply power is limited to approximately 70% of the rated power of the lamp according to FIG. 1 when the lamp is in the initial lighting point (the accumulated interval of on-time is 0 hour). Thus, with regard to the relationship between the light control signal and the supply power to the lamp, the maximum supply power is maintained constant at 70% adjacent to the maximum value (FULL) of the light control signal as shown in FIG. 3(a). In addition, when the accumulated interval of on-time reaches the rated lamp life (12,000 hours in this case) or near, the maximum supply power is maintained constant at 100% adjacent to the maximum value (FULL) of the light control signal as shown in FIG. 3(b) since the maximum supply power becomes approximately 100% of the rated power of the lamp due to the initial illuminance correction function.

When a user temporarily desires the output larger than the maximum supply power limited by the initial correction function, the relationship between the light control signal and the supply power to the lamp is shifted to a curve of FIG. 3(c), whereby the light control operation is available in the range between the output at 100% and the minimum supply power. Note that, the curve shown in FIG. 3(c) represents a property of the lamp in the initial lighting point (the accumulated interval of on-time is 0 hour), in which a slope of the curve varies as the accumulated interval of on-time increases, thereby approaching a property of FIG. 3(b).

Figure 4:
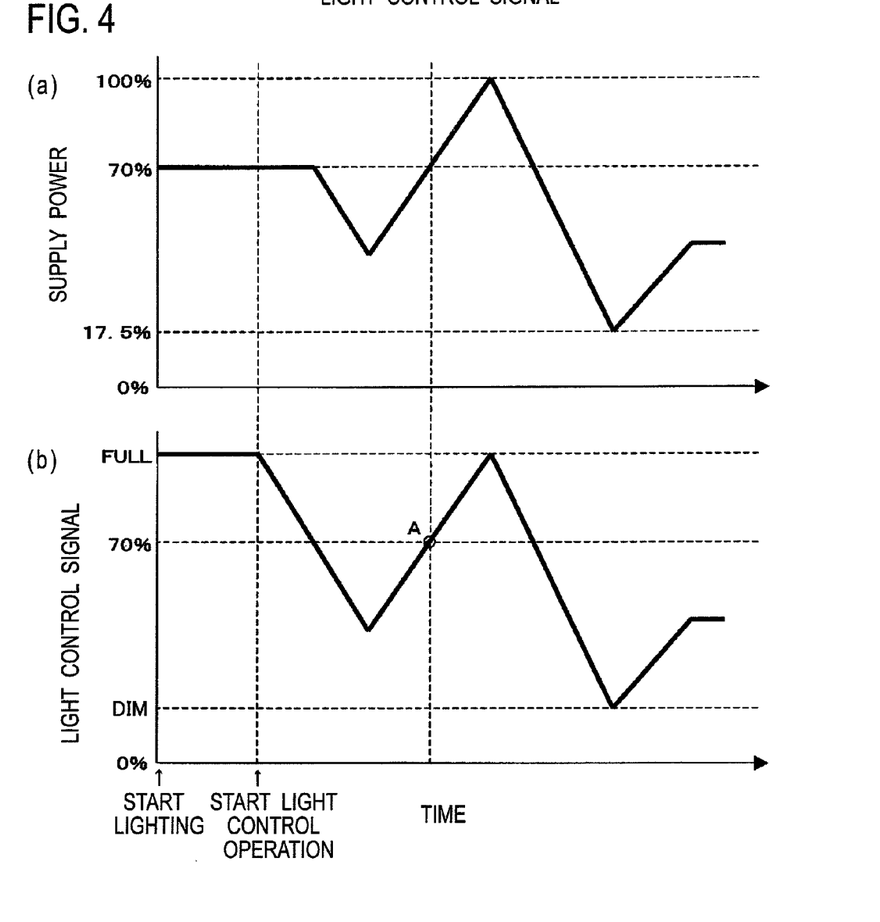
FIG. 4 is an operational explanatory diagram of the first embodiment of the present invention.

Next, a shifting process of the light control property curve from (a) to (c) shown in FIG. 3 will be explained. As shown in FIG. 4, when the light control signal (b) has a value above the maximum supply power (70% in this case) limited by the initial illuminance correction function in a point when the lamp starts lighting by e.g. turning on a power supply of the illumination apparatus, the lamp starts lighting by the supply power of 70% by putting priority on the maximum supply power limited by the initial illuminance correction function.

When the light control signal (b) has the value above the maximum supply power (70% in this case) limited by the initial illuminance correction function as shown in FIG. 4 when the light control signal varies due to an operation of the light controller and the like by a user, the lamp keeps lighting by the supply power of 70% by putting priority on the maximum supply power limited by the initial illuminance correction function. When the value of the light control signal (b) falls below the maximum supply power (70% in this case) limited by the initial illuminance correction function, the lamp is lighted by the supply power corresponding to the light control signal, thereby performing the light control of the lamp. Then, the light control property curve shown in FIG. 3 is shifted from (a) to (c) from a point (point A) when the value of the light control signal (b) exceeds the maximum supply power (70% in this case) limited by the initial illuminance correction function due to the operation of the light controller and the like by the user. Thus, it is possible to perform the light control corresponding to the light control signal in the range between 100% and the minimum supply power (17.5% in this case) of the supply power to the lamp.

Figure 5:
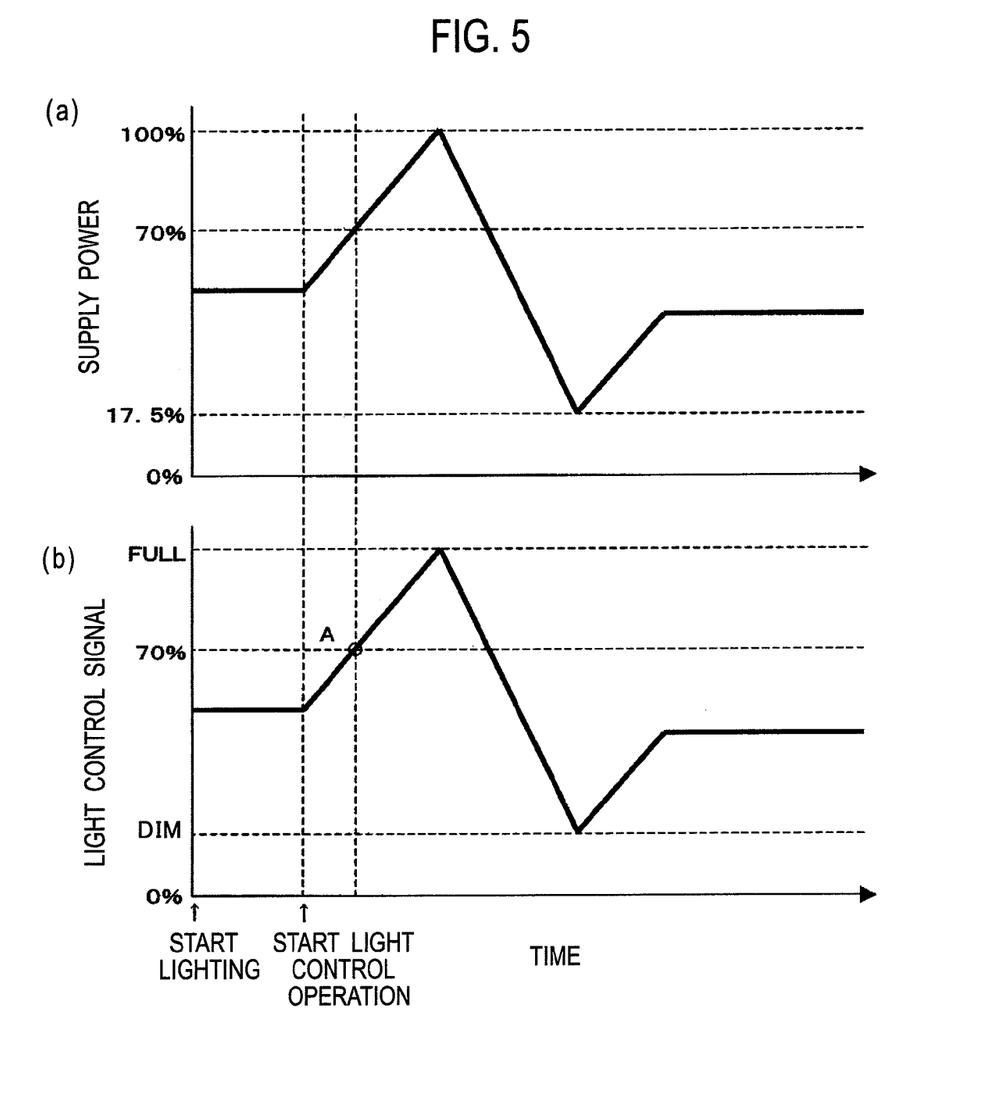
FIG. 5 is an operational explanatory diagram of the first embodiment of the present invention.

As shown in FIG. 5, when the value of the light control signal (b) is below the maximum supply power (70% in this case) limited by the initial illuminance correction function in the point when the lamp starts lighting by e.g. turning on the power supply of the illumination apparatus, the lamp starts lighting by the supply power corresponding to the light control signal by putting priority on the supply power corresponding to the light control signal. Then, the light control property curve shown in FIG. 3 is shifted from (a) to (c) from the point (point A) when the value of the light control signal (b) exceeds the maximum supply power (70% in this case) limited by the initial illuminance correction function due to the operation of the light controller and the like by the user. Thus, it is possible to perform the light control corresponding to the light control signal in the range between 100% and the minimum supply power (17.5% in this case) of the supply power to the lamp.

As described above, the light control operation for larger than the maximum supply power limited by the initial illuminance correction function is allowed at the point when the light control signal exceeds the maximum supply power limited by the initial illuminance correction function after the lamp starts lighting. Accordingly, it is possible to set a desired light output in the range of larger than the maximum supply power limited by the initial illuminance correction function simply by operating the light controller and the like in a direction larger than the maximum supply power limited by the initial illuminance correction function without requiring the user to have any special switching operation. Moreover, when the power supply is once turned off and then the lamp is lighted again, the normal initial illuminance correction operation (FIG. 3(a)) is configured to be perfolmed again. Therefore, it is possible to obtain an effect of saving electricity by the initial illuminance correction function without requiring the user to have any special switching operation.

According to the present embodiment, in the illumination apparatus concurrently having the initial illuminance correction function and the light control function, it is possible to temporarily increase brightness in response to a demand of a user with a normal operation of the light controller and the like without requiring the user to perform any special operation.

Second Embodiment

Figure 6:
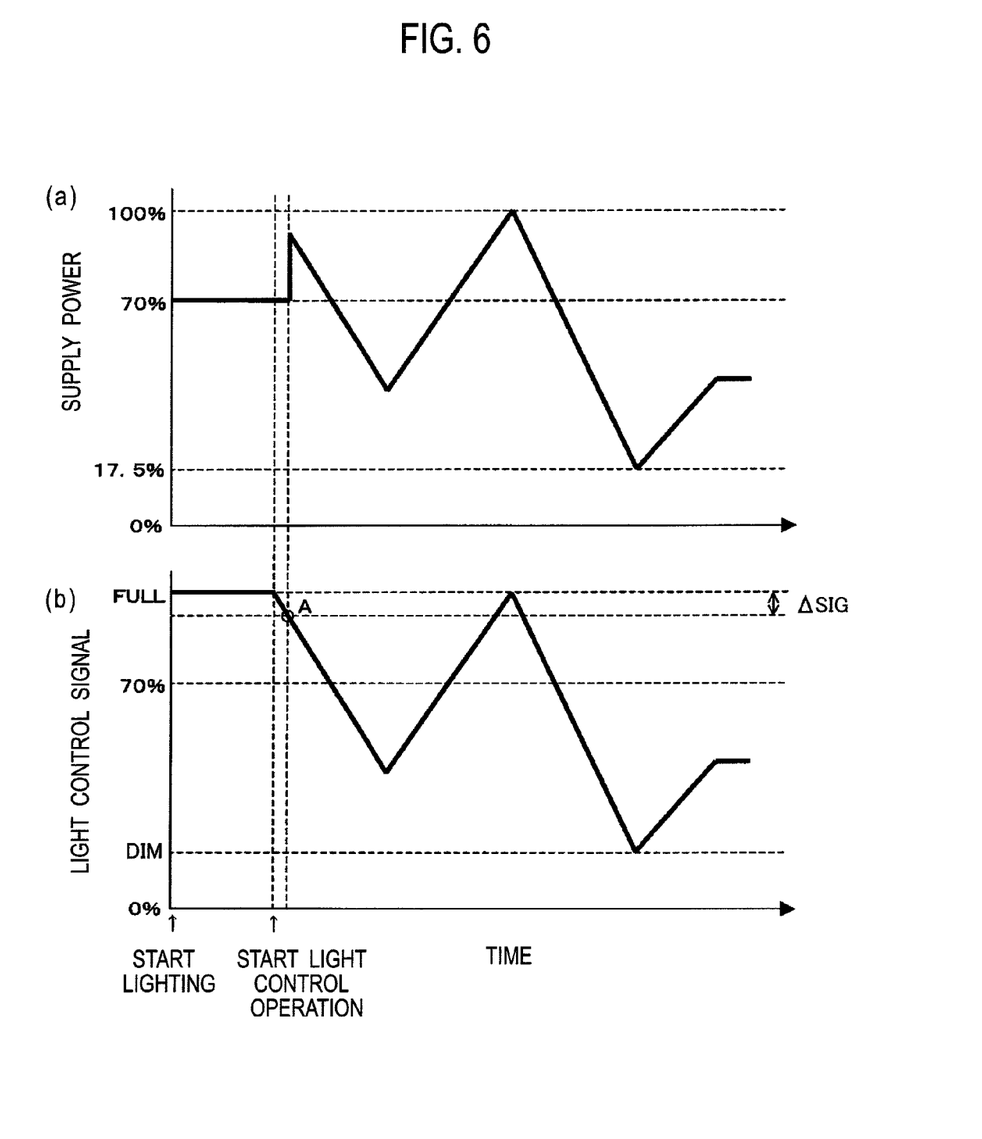
FIG. 6 is an operational explanatory diagram of a second embodiment of the present invention.
Figure 7:
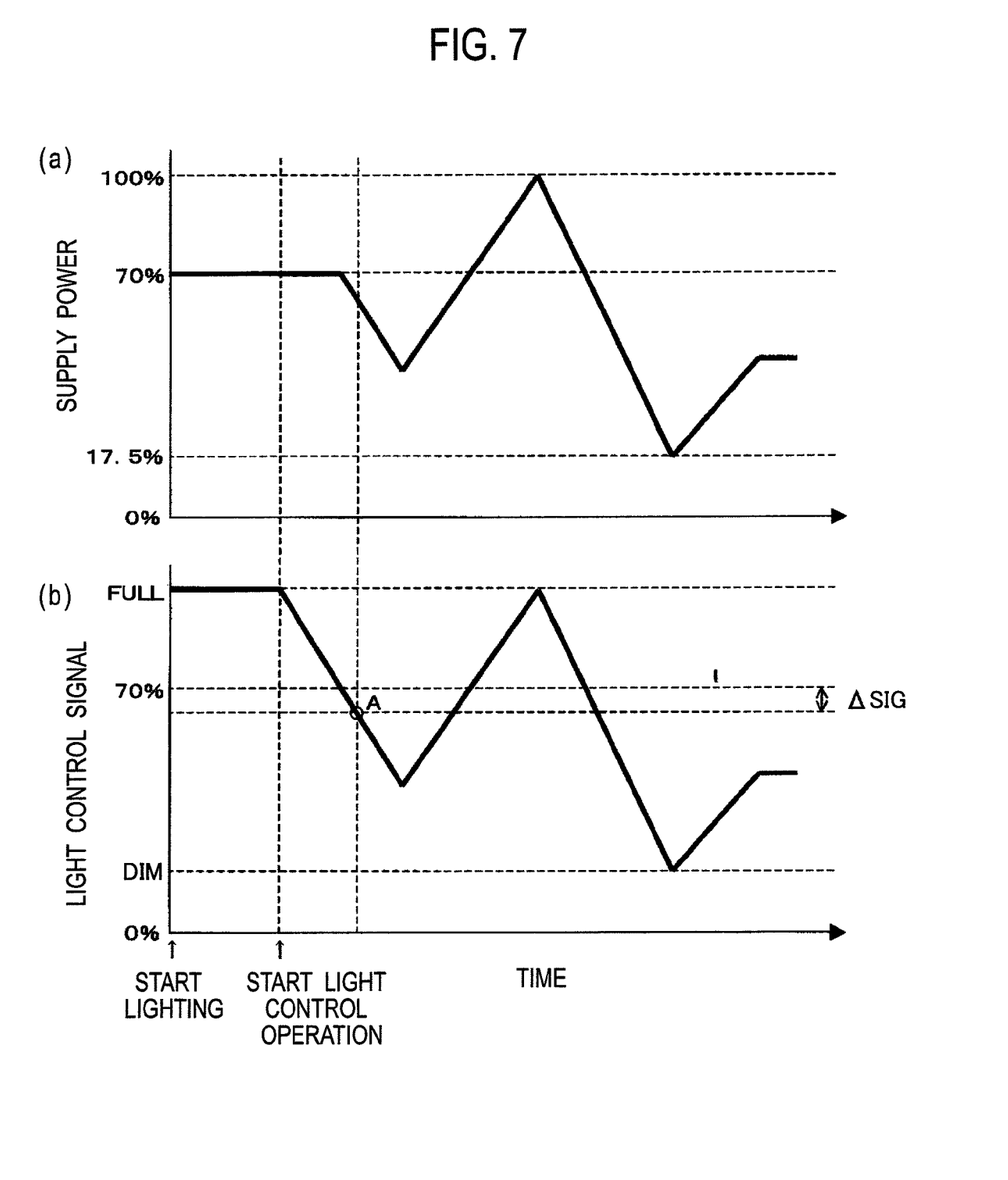
FIG. 7 is an operational explanatory diagram of the second embodiment of the present invention.
Figure 8:
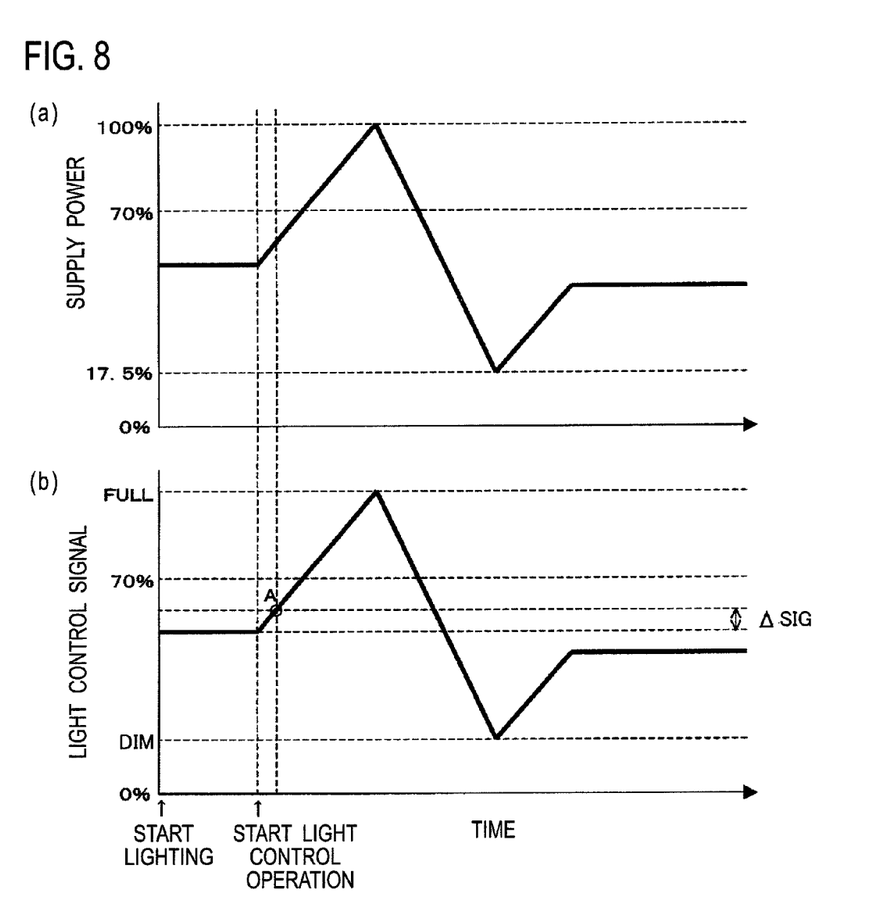
FIG. 8 is an operational explanatory diagram of the second embodiment of the present invention.

An illumination apparatus according to the second embodiment of the present invention will be explained. FIGS. 6 to 8 show operations of the illumination apparatus of the present embodiment. Note that, the present embodiment is similar to the first embodiment except for the shifting process of the light control property curve from (a) to (c), and the similar explanation to the first embodiment is omitted.

In the present embodiment, as shown in FIG. 6, when the light control signal (b) has a value above the maximum supply power (70% in this case) limited by the initial illuminance correction function in a point when the lamp starts lighting by e.g. turning on a power supply of the illumination apparatus, the lamp starts lighting by the supply power of 70% by putting priority on the maximum supply power limited by the initial illuminance correction function.

When the light control signal varies due to an operation of the light controller and the like by a user, the light control property curve shown in FIG. 3 is shifted from (a) to (c) from a point (point A) when a fluctuation range of the light control signal (b) exceeds a prescribed fluctuation range (ΔSIG) as shown in FIG. 6. Thus, it is possible to perform the light control corresponding to the light control signal in the range between 100% and the minimum supply power (17.5% in this case) of the supply power to the lamp. In this case, as shown in FIG. 6, the amount of the supply power (a) immediately changes from 70% to the amount of the supply power corresponding to the light control signal in the point (point A) when the fluctuation range of the light control signal (b) exceeds the prescribed fluctuation range (ΔSIG). Then, it is possible to arbitrarily perform the light control in the range between 100% and the minimum supply power (17.5% in this case) according to the light control signal (a).

The immediate change of the amount of the supply power at the point (point A) in FIG. 6 is allowable enough in normal use and considered insignificant substantially. Meanwhile, in a range where the light control signal (b) is below the maximum supply power (70% in this case) limited by the initial illuminance correction function, as shown in FIG. 7, the light control property curve shown in FIG. 1 is configured to be shifted from (a) to (c) at a point (point A) when a fluctuation of the light control signal (b) more than a prescribed fluctuation range (ΔSIG) is detected. As a result, the amount of the supply power, i.e. brightness of the lamp is not immediately changed. Thus, it is possible to perform the light control continuously without providing a sense of discomfort to a user.

FIG. 8 shows an operation when the value of the light control signal (b) is below the maximum supply power (70% in this case) limited by the initial illuminance correction function at a point when the lamp starts lighting by e.g. turning on a power supply of the illumination apparatus. In this case as shown in FIG. 8, the lamp starts lighting by the supply power corresponding to the light control signal by putting priority on the supply power corresponding to the light control signal. Then, the light control property curve shown in FIG. 3 is shifted from (a) to (c) from a point (point A) when a fluctuation range of the light control signal (b) exceeds a prescribed fluctuation range (ΔSIG) by the operation of the light controller and the like by a user. Thus, it is possible to perform the light control corresponding to the light control signal in the range between 100% and the minimum supply power (17.5% in this case) of the supply power to the lamp.

As described above, the light control operation for larger than the maximum supply power limited by the initial illuminance correction function is allowed at the point when the fluctuation range of the light control signal exceeds a prescribed fluctuation range after the lamp starts lighting. Accordingly, it is possible to set a desired light output in the range of larger than the maximum supply power limited by the initial illuminance correction function simply by operating the light controller and the like without requiring a user to have any special switching operation. Moreover, when the power supply is once turned off and then the lamp is lighted again, the normal initial illuminance correction operation (FIG. 3(*a*)) is configured to be performed again. Therefore, it is possible to obtain an effect of saving electricity by the initial illuminance correction function without requiring the user to have any special switching operation.

According to the present embodiment, in the illumination apparatus concurrently having the initial illuminance correction function and the light control function, it is possible to temporarily increase brightness in response to a demand of a user with a normal operation of the light controller and the like without requiring the user to perform any special operation.

Third Embodiment

Figure 9:
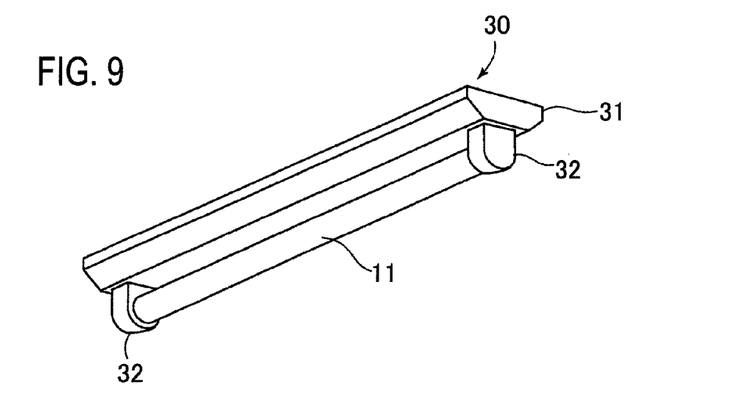
FIG. 9 is a perspective view of an illumination apparatus of a third embodiment of the present invention.

An illumination apparatus according to the third embodiment of the present invention will be explained. The present embodiment represents one example of a specific constitution of the illumination apparatus. FIG. 9 shows one example of an overview of a lighting fixture composing the illumination apparatus. A lighting fixture 30 is composed of a fluorescent lamp 11, a socket 32 for holding and electrically connecting the fluorescent lamp 11 to a lighting circuit stored in the lighting fixture 30, and a housing 31 for storing the lighting circuit. The lighting fixture 30 is connected to a commercial power supply supplied to the lighting circuit, and externally applied with the light control signal by a wired or wireless means. The lighting circuit stored in the lighting fixture performs lighting and light controlling of the fluorescent lamp, and has the operational functions described in the first and second embodiments. By using one or more such lighting fixtures, it is possible to obtain a high power-saving effect due to the combination of the initial illuminance correction function and the light control function. Moreover, it is possible to provide the highly convenient illumination apparatus capable of performing light controlling so as to have desired brightness due to the operation of the light controller by a user.

Figure 10:
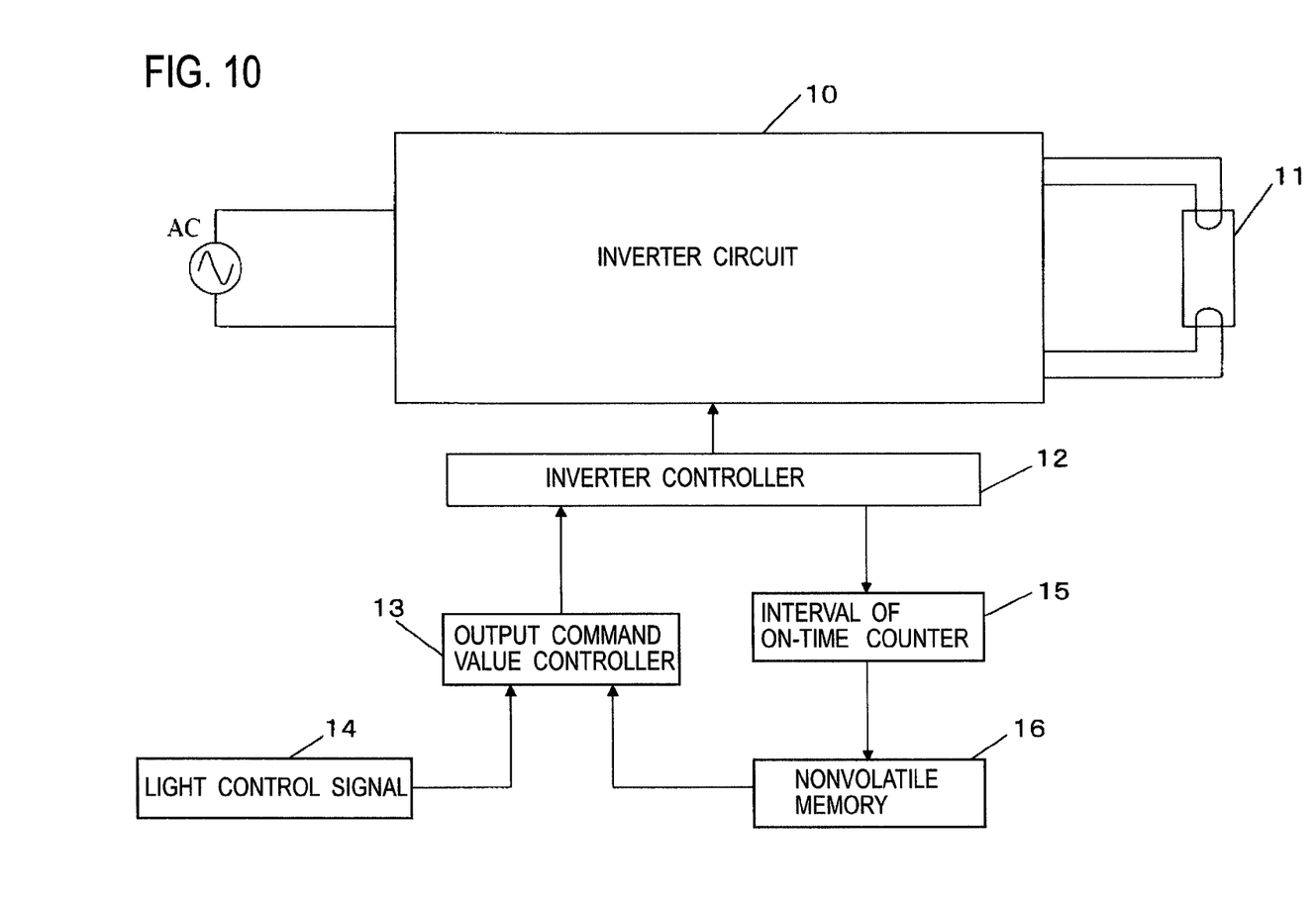
FIG. 10 is a block diagram of a lighting circuit used in the third embodiment of the present invention.

FIG. 10 shows a schematic constitution of the lighting circuit stored in the illumination apparatus of the present embodiment. As shown in FIG. 10, the lighting circuit includes a commercial alternating-current power source AC to be input in the illumination apparatus, an inverter circuit 10 for converting a commercial AC source voltage into a high-frequency voltage and turning on the fluorescent lamp 11 at a high frequency, and an inverter controller 12 for controlling power supplied to the fluorescent lamp 11 from the inverter circuit 10. In addition, an interval of on-time counter 15 measures interval of on-time of the fluorescent lamp 11, and the interval of on-time as measured is sequentially stored in a nonvolatile memory 16 as an accumulated interval of on-time. An output command value controller 13 determines an output command value corresponding to a light flux decline correction value and a light control signal 14, according to the accumulated interval of on-time stored in the nonvolatile memory 16, followed by outputting the output command value to the inverter controller 12.

Generally, the output command value controller 13 and the interval of on-time counter 15 can be composed of a general-purpose microprocessor, and the like. The nonvolatile memory 16 can be composed of a nonvolatile memory such as a general-purpose EEPROM and a flash memory stored in a microprocessor.

Note that, the diagrams and values in each embodiment show examples for convenience to explain the operations of each embodiment. The present invention is not limited to those diagrams and values.

INDUSTRIAL APPLICABILITY

According to the present invention, the illumination apparatus concurrently having the initial illuminance correction function and the light control function can be applied to a purpose to temporarily provide brightness corresponding to a power larger than the maximum supply power limited by the initial illuminance correction function by a normal operation of the light controller.

The invention claimed is:

1. An illumination apparatus comprising:
a lighting device adapted to turn on a lamp and control supply power to the lamp;
an element configured for measurement and storage of an accumulated interval of on-time of the lamp;
an element configured for control of supply power to the lamp in accordance with the accumulated interval of on-time as stored; and
an element configured for varying supply power to the lamp in accordance with an externally input light control signal, wherein
the illumination apparatus is adapted to use a prescribed operation with respect to a light control signal for supply power to the lamp to be adjustable to be higher than a maximum supply power to the lamp in accordance with the accumulated interval of on-time.

2. The illumination apparatus according to claim 1, the illumination apparatus is adapted to work with the prescribed operation with respect to a light control signal to adjust supply power to the lamp in accordance with a light control signal at least within a range of supply power equal to or larger than the maximum supply power to the lamp in accordance with the accumulated interval of on-time.

3. The illumination apparatus according to claim 1, illumination apparatus is adapted to
have a variable range of supply power to the lamp in accordance with a light control signal at least from a rated power or near to a prescribed minimum power of the lamp, and
work, upon power-on of the illumination apparatus or start of illumination of the lamp with supply power to the lamp in accordance with a light control signal exceeding the maximum supply power to the lamp in accordance with the accumulated interval of on-time, to supply the lamp with the maximum supply power to the lamp in accordance with the accumulated interval of on-time.

4. The illumination apparatus according to claim 1, the illumination apparatus is adapted to have the prescribed operation with respect to a light control signal to operate a light control signal to exceed the maximum supply power to the lamp in accordance with the accumulated interval of on-time after power-on of the illumination apparatus or start of illumination of the lamp.

5. The illumination apparatus according to claim 1, the illumination apparatus is adapted to have the prescribed operation with respect to a light control signal to vary a light control signal in a prescribed level or more after power-on of the illumination apparatus or start of illumination of the lamp.

6. The illumination apparatus according to claim 5, the illumination apparatus is adapted to have the prescribed operation with respect to a light control signal to be valid only for supply power to the lamp below the maximum supply power to the lamp in accordance with the accumulated interval of on-time.

* * * * *